United States Patent [19]

Nelson et al.

[11] E Patent Number: Re. 32,746

[45] Reissued Date of Patent: Sep. 13, 1988

[54] STRAIN/DEFLECTION SENSITIVE VARIABLE RELUCTANCE TRANSDUCER ASSEMBLY

[75] Inventors: Harold K. Nelson, Seattle; Charles A. Kleingartner; LeRoy E. Vetsch, both of Bothell, all of Wash.

[73] Assignee: Weico Corporation, Excelsior, Minn.

[21] Appl. No.: 4,174

[22] Filed: Jan. 9, 1987

Related U.S. Patent Documents

Reissue of:

[64] Patent No.: 4,269,070
Issued: May 26, 1981
Appl. No.: 80,048
Filed: Sep. 28, 1979

[51] Int. Cl.[4] ..... G01B 7/16

[52] U.S. Cl. ..... 73/779; 336/130

[58] Field of Search ..... 73/779, 849, 862.54, 73/862.64, 854, 1 B, 1 C; 336/30, 65, 68, 90, 130, 220, 221

[56] References Cited

U.S. PATENT DOCUMENTS

| | | | |
|---|---|---|---|
| 2,615,330 | 10/1952 | Blackmon et al. . | |
| 2,638,780 | 5/1953 | Holford | 73/779 |
| 2,839,733 | 6/1958 | Bassett | 336/30 |
| 3,033,032 | 5/1962 | Glerum . | |
| 3,118,121 | 1/1964 | Tavis | 336/30 |
| 3,390,575 | 7/1968 | Hukle . | |
| 3,464,259 | 9/1959 | Farr . | |
| 3,486,371 | 12/1969 | Dybvad et al. . | |
| 3,521,484 | 7/1970 | Dybvad et al. . | |
| 3,562,687 | 2/1971 | Tavis | 336/30 |
| 3,620,074 | 11/1971 | Laimins et al. | 73/862.54 X |
| 3,739,196 | 6/1973 | Tavis | 307/229 |
| 4,210,216 | 7/1980 | Godden | 177/134 |
| 4,267,724 | 5/1981 | Spoor | 73/862.65 |
| 4,312,042 | 1/1982 | Bateman | 364/463 |
| 4,327,591 | 5/1982 | Dybel et al. | 73/855 |

*Primary Examiner*—Jerry W. Myracle
*Attorney, Agent, or Firm*—Graybeal, Jensen & Puntigam

[57] ABSTRACT

A variable reluctance transducer assembly for measuring the strain deflection in a structural member includes an elongate housing which is mounted to a first lug extending transversely outwardly from the structural member. The housing supports a pair of magnetic cores in spaced parallel relationship to each other. Each core in turn supports a wire coil. The coils are wired to each generate a magnetic field when energized by an electric current. The transducer assembly is also composed of an elongate target mounted on a second lug extending transversely from the structural member at a location longitudinally spaced from the other lug. The target includes a plate portion which extends longitudinally toward the housing to lie nominally between the two spaced apart cores and their corresponding coils to form a portion of the path along which the magnetic lines of flux eminating for each of the two coils travels. A flexible metal bellows interconnects the housing and target to enclose the cores and target plate while simultaneously permitting the target plate to move toward and away from the cores in response to the relative movement between the mounting lugs to thereby vary the reluctance between the target plate and each coil.

28 Claims, 2 Drawing Sheets

STRAIN/DEFLECTION SENSITIVE VARIABLE RELUCTANCE TRANSDUCER ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to a transducer for measuring physical parameters, and more specifically to a variable reluctance transducer especially adapted to determine the load carried by a structural member by measuring the strain or deflection therein.

2. Description of the Prior Art

For safety and regulatory reasons, a need exists to determine the load being carried by structural members such as components of aircraft landing gear and axles of trucks, trailers and other vehicles. From these load measurements, it is possible to compute the weight being carried by aircraft, trucks and other vehicles to insure that they are not loaded beyond their capacity to safely carry loads or beyond the maximum weight limits set by various government bodies. Also, from this information the speed and other flight parameters of airplanes can be optimized to achieve the most fuel efficient flight conditions. Furthermore, from knowledge of the loads being carried by aircraft landing gear, it is possible to calculate the center of gravity of aircraft to make certain that it is not too far rearward to cause the aircraft to pivot rearwardly about its rear landing gear or too far forward to impair the ability of the aircraft to take off safely. Monitoring the load carried by aircraft landing gear also permits a determination to be made whether an impact caused by a hard landing was of sufficient magnitude to either damage the landing gear or require that an inspection of the landing gear be made to determine if any structural damage has occurred. Moreover, ascertaining the loads carried by aircraft landing gear members and vehicle axles permits the determination of the weight carried by each tire to thereby insure that the tires are properly inflated and are not loaded beyond safe limits.

The currently employed manner in determining the weight carried by structural beams such as aircraft landing gear members or truck axles is by the use of a strain gage type of transducer. U.S. Pat. Nos. 3,390,575 to Hukle and 3,464,259 to Farr disclose flexural beam type strain gage transducers which are mounted on a pair of lugs located along the length of and extending transversely outwardly from the outer surface of a landing gear. The lugs have flat surfaces disposed substantially coplanar to each other on which the transducer is mounted. The transducers disclosed in these two patents theoretically measure the relative movement between the two mounting lugs to thereby determine the load being transmitted through the axle.

In another type of strain gage transducer system disclosed in U.S. Pat. No. 3,521,484 to Dybvad et al, two cylindrically shaped disks are securely attached to the inside diameter of a hollow structural member, such as an aircraft landing gear axle. Each disk includes a central hub portion for carrying one end portion of an elongate sensing beam to which strain gages have been attached. The sensing beam deforms in response to the flexure of the loaded axle. As the sensing beam deforms, the physical dimensions of the strain gage wire changes thereby causing a change in the electrical resistance of the wire. The strain gages are wired together to form the arms of a Wheatstone bridge circuit producing an output signal theoretically proportional to the shear forces acting on the axle.

Strain gage type transducers, however, have drawbacks which reduce the desirability of their use, especially in such harsh environments as are associated with aircraft landing gears and truck axles. The components of strain gage transducers, including the very fine wires composing strain sensitive elements of the gage itself, are susceptible to damage from handling during shipment or storage and during the installation of the transducer. Even when strain gage type transducers are installed without being damaged, they are susceptible to failure from the shock loads and impacts normally imposed on aircraft landing gears and vehicle axles.

Another disadvantage of strain gage type transducers is that the resistance in the strain sensitive elements tends to change with the surrounding temperature thereby generating erroneous electrical output signals unless a system is provided to compensate for the changes in temperature. Moreover, the particular compensating device utilized must be capable of nulling out the changes in temperature while also ensuring that the device itself is not affected by loads acting in directions other than the direction of the load being measured. Consequently, rather sophisticated temperature compensating components are required.

If the particular load or strain being measured is large, the strain gage must be mounted on a separate mounting beam or other member which in turn is secured to the particular structural member being monitored at various mounting points. As a consequence, the strain gage mounting member itself may affect the load on the structural member being measured and thereby produce an erroneous determination of the load being carried by the structural member. Also, the manner of connecting the strain gage mounting member to the mounting points of the member being measured may cause an undue initial load to be placed on such connection points also resulting in an incorrect load measurement.

Another drawback of strain gage type transducers stems from the fact that the electrical output voltage produced by these transducers is quite small, usually on the order of a few millivolts, and has significant source resistance. Thus, the accuracy of the strain gage system may be severely reduced by a low impedance electrical leakage caused by moisture either within the transducer or in the wiring to the transducer.

It is therefore a primary goal of the present invention to provide a variable reluctance transducer which is free of the above described deficiencies of strain gage type transducers to thereby be capable of accurately measuring the loads on structural components such as aircraft landing gear members. Variable reluctance transducers have in the past been used to measure pressures. One example of this type of transducer is disclosed by Tavis U.S. Pat. No. 3,118,121, wherein two spaced apart magnetic cores are fixedly held within a cylindrical housing. Each core is adapted to support a wire wound coil. A diaphragm plate separates the two cores and divides the housing into two individual pressure chambers. Magnetic plates are welded to each side of the diaphragm plate to lie closely adjacent each core.

Ports are provided in the housing to enable fluid under pressure to enter each chamber, with the pressure differential existing across the diaphragm causing it to deflect toward the chamber subjected to the lower pressure. As the differential pressure responsive diaphragm is deflected, the magnetic plates move relative to their respective cores thereby altering the magnetic reluctance of the magnetic path extending through the core.

A variable reluctance transducer designed to measure the pressure of the fluids in a manner similar to the above described Tavis '121 patent is disclosed by Tavis U.S. Pat. No. 3,562,687. In this particular transducer, each core is constructed from a circular, center pole plate from which a plurality of slender, spaced apart legs extend radially outwardly. Each of the legs is U-shaped to thereby define a segmented, annular channel for receiving a coil therein. An enlarged, arcuate tab extends laterally outwardly from the end of each leg opposite the center pole plate to thereby define a segment annularly shaped outer pole face which is substantially coplanar with the center pole plate.

SUMMARY OF THE INVENTION

The present invention relates to a variable reluctance transducer assembly especially adapted to measure unidirectional deflection in a loaded member. The transducer assembly is mounted between two spaced mounting points located on or depending from the member subjected to load. The transducer assembly includes a target which has a base for mounting the target on one of the two assembly mounting points to permit the target to move therewith. The transducer also includes an elongate housing having a mounting base adapted to be mounted on the second of the two mounting points to permit the housing to move therewith. The housing is further composed of a pair of spaced, parallel core mounting arms which cantilever outwardly from one end of said housing mounting base in a direction toward the target. The arms support a pair of magnetic cores in spaced apart relationship, transversely to the length of the housing and longitudinally substantially halfway between the two transducer mounting points. A wire wound coil is secured to each of the cores with the coils disposed in spaced, substantially coaxial, parallel relationship to each other.

The target is constructed with a flat, magnetically permeable target plate which is cantilevered outwardly from one end of the target mounting base to extend in a direction toward the housing. When the member on which the transducer is mounted is not subjected to a load, the target plate nominally lies substantially midway between the two magnetic cores and their corresponding coils. The housing and target, however, are free to move relative to each other in response to the movement of the member on which the transducer is mounted thereby causing the target plate to move toward and away from the magnetic cores to vary the air gaps separating them.

To avoid damage to the transducer during shipment or installation, stop means are provided to limit the movement of the target plate toward and away from the two cores. The stop means includes a tip member which extends longitudinally outwardly from the free end portion of the target plate in a direction opposite the target mounting base to engage within a socket formed in the adjacent end portion of the housing mounting base. The stop means is further composed of a tip member which extends longitudinally outwardly from the free end portion of each of the housing arms in a direction toward the target mounting base. When one of the arms shifts too closely toward the target plate, the tip portion of the particular arm abuts against a boss formed in the adjacent end portion of the target mounting base.

The transducer assembly additionally incorporates a bellows member which extends between the mounting bases of the housing and target to enclose and protect the two cores and their corresponding coils and the target plate. The bellows member is flexible enough to permit the target plate and the cores to move freely relative to each other in response to the relative movement between the mounting points of the member on which the transducer is mounted.

It is a principal object of the present invention to provide a variable reluctance transducer assembly capable of measuring a desired strain and deflection in a structural member while simultaneously screening out other types of strains existing in the member due to forces acting in directions other than the direction of the strain in question.

It is a further object of the present invention to provide a variable reluctance transducer assembly which nulls out the effect of the temperature changes in the environment within which the transducer operates, without requiring any additional mechanical or electrical components or electrical circuitry.

It is an additional object of the present invention to provide a variable reluctance transducer assembly which provides a relatively high output electrical signal in proportion to the magnitude of the input electrical signal and with low source impedance, thereby also resulting in an output signal of significantly improved integrity.

Still another object of the present invention is to provide a variable reluctance transducer assembly which can be precalibrated during manufacture so that the transducers can be substituted one for another without requiring any additional adjustments to be made during installation or use.

Yet another object of the present invention is to provide a variable reluctance transducer assembly which is rugged enough not only to withstand the harsh environments associated with aircraft landing gears and truck axles in use, but also to withstand over stress conditions which may occur during installation and handling.

An additional object of the present invention is to provide a variable reluctance transducer assembly which can be mounted directly to the structural member in which the load being carried is to be monitored, to thereby directly measure the load related deformation of the structural member.

It is also an object of the present invention to provide a variable reluctance transducer assembly which is very compliant and thus does not contribute to or detract from the load carried by the member being monitored, nor imparts any significant preload to the attachment points of the transducer or to the member being measured thereby preventing any unpredictable distortion of the loaded member or the attachment points.

A further object of the present invention is to provide a variable reluctance transducer assembly requiring a minimum of electrical connections to connect the transducer to its corresponding electrical circuitry, to thereby improve the reliability of the transducer.

Yet an additional object of the present invention is to provide a variable reluctance transducer assembly which may be conveniently and easily secured to its operating location with a minimum of time and effort and without requiring any special skills, tools or procedures.

Still another object of the present invention is to provide a variable reluctance transducer assembly which produces a repeatable, high level output signal proportional to the load carried by the member being monitored and over a wide variation in such load.

Yet a further object of the present invention is to provide a variable reluctance transducer assembly which is capable of accurately measuring very minute deflections of structural members.

DETAILED DESCRIPTION

Figure 1:
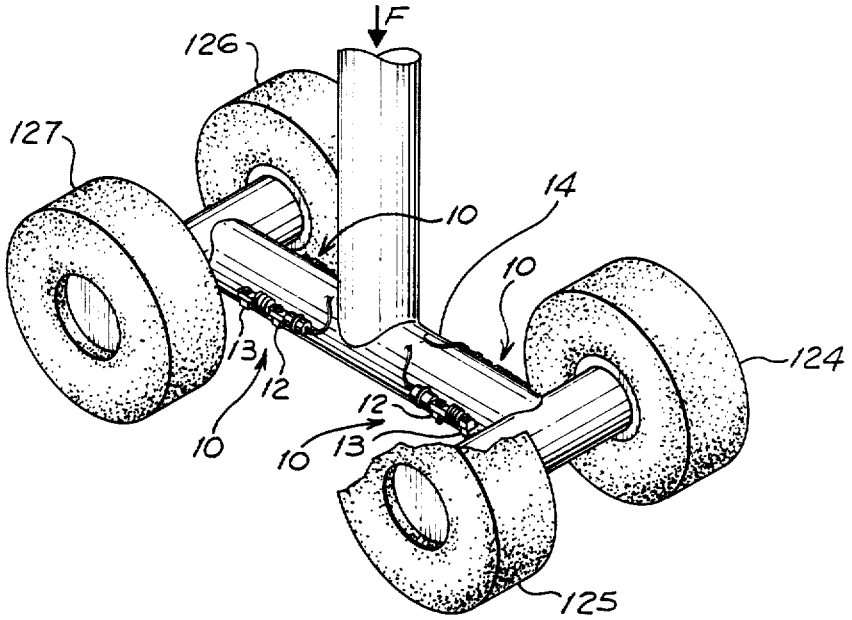
FIG. 1 is an isometric view illustrating several transducers constructed according to a typical embodiment of the present invention, mounted on a bogie beam of an aircraft landing gear.

Referring initially to FIG. 1, a variable reluctance transducer assembly 10 constructed according to the present invention is shown as mounted on a pair of spaced apart lugs 12 and 13 extending transversely from bogie member 14 adjacent each tire 124, 125, 126 and 127 of a typical aircraft landing gear arrangement. Now referring additionally to FIGS. 2 and 3, each variable reluctance transducer assembly 10 basically comprises an elongate housing 16 which is attached to a lug 12 to move therewith. Housing 16 supports a pair of magnetic cores 18 in spaced parallel relationship to each other. Each core 18 in turn supports a wire coil 20. The two wire coils 20 are wired together in series to permit an electrical excitation voltage to be applied across them. An elongate target 22 is mounted on lug 13 to lie generally colinear with housing 16 and to move in response to the movement of said lug 13. Target 22 includes a plate portion 26 which extends longitudinally of lug 13 toward lug 12 to lie between the two spaced cores 18 and their corresponding coils 20. A bellows 28 is connected to both housing 16 and target 22 to simultaneously enclose cores 18 and target plate 26, but still permit said housing 16 and target 22 to move relative to each other.

In operation, when an electrical signal is imposed across coils 20, a magnetic field is produced between each coil 20 and target plate 26. Moreover, as housing 16 and target 22 move in response to the shifting of lugs 12 and 13 when bogie beam 14 is deformed in shear under load F, the air gap between one coil 20 and target plate 26 increases while the air gap between the other coil 20 and target plate 26 decreases, thereby varying the reluctance of the magnetic path between said coils 20 and target plate 26. This variation in reluctance changes the inductance of coils 20, thereby altering the voltage drop across each of said coils 20 in proportion to the change in the thickness of the air gap existing between said coil 20 and target plate 26. By measuring this change in the output or signal voltage, it is possible to determine the extent of relative movement between target plate 26 and coils 20 and thus the load F carried by bogie beam 14.

The basic components and operation of the typical embodiment of the present invention set forth above is next described with greater specificity. Referring to FIGS. 1-4, longitudinally spaced apart lugs 12 and 13 extend transversely outwardly from the outer circumference of bogie beam 14. Lugs 12 and 13 are essentially of identical rectangular shape and are positioned so that the vertical center of each of said lugs are located on or near the vertical center line of bogie team 14, FIGS. 3 and 5. Lugs 12 and 13 have flat upper mounting surfaces 30 and 32, respectively, which are nominally disposed coplanar with each other. A hole 34 extends vertically through lugs 12 and 13.

Figure 2:
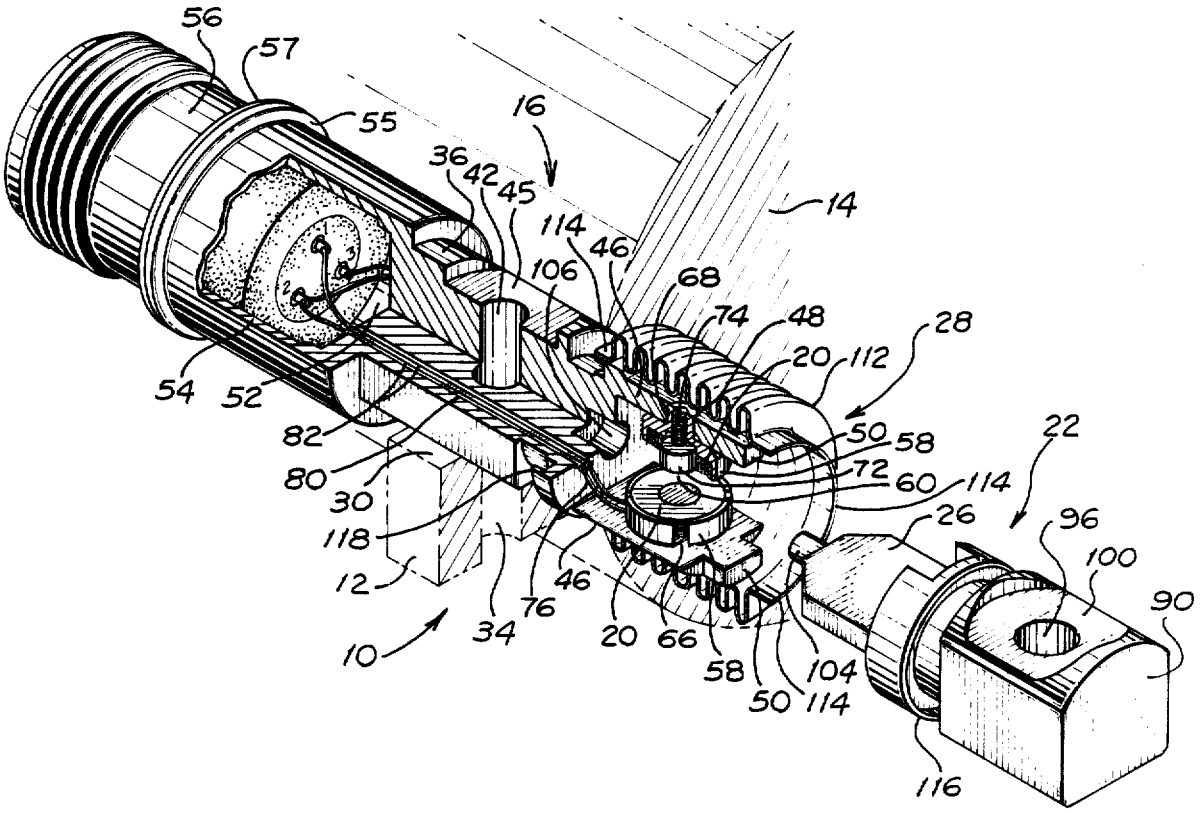
FIG. 2 is an enlarged, exploded, isometric view of one typical embodiment of the present invention, with portions shown in section for clarity.
Figure 3:
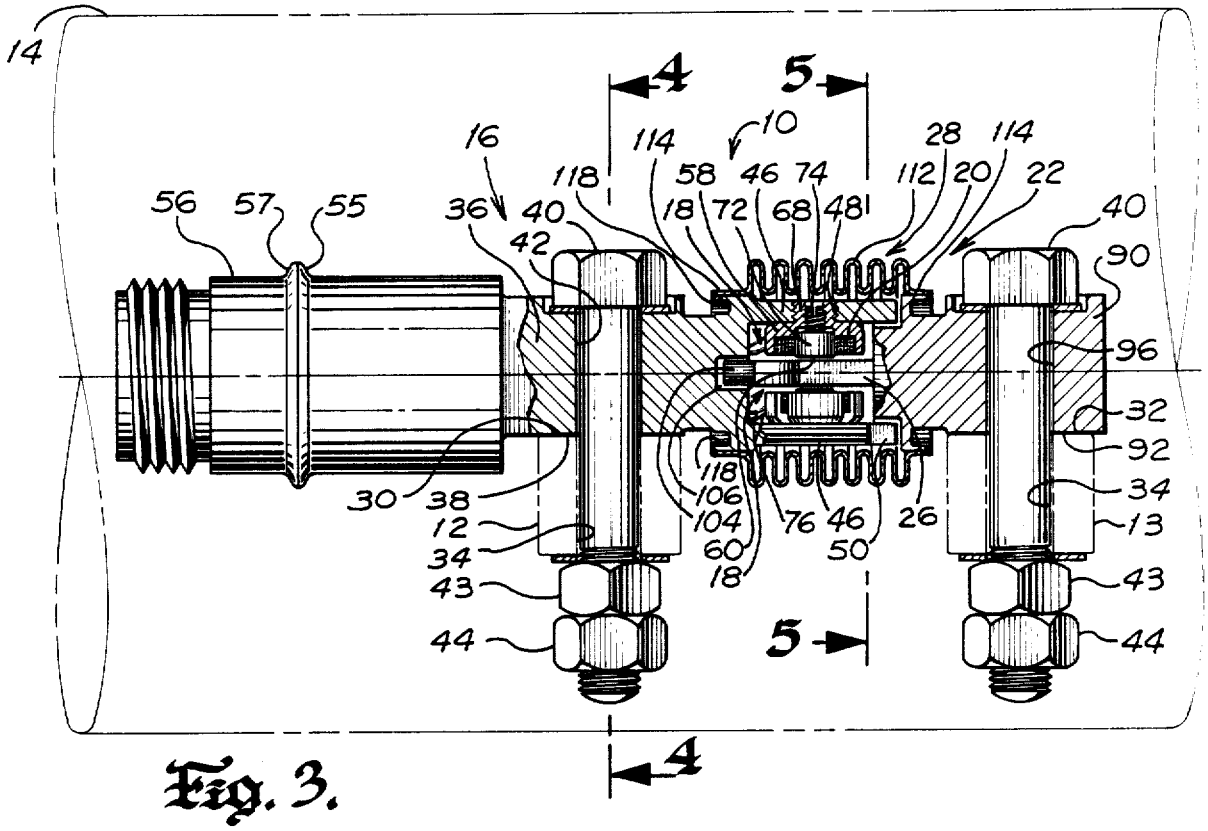
FIG. 3 is an enlarged, partial cross-sectional elevational view of the embodiment of the present invention shown in FIG. 2.
Figure 4:
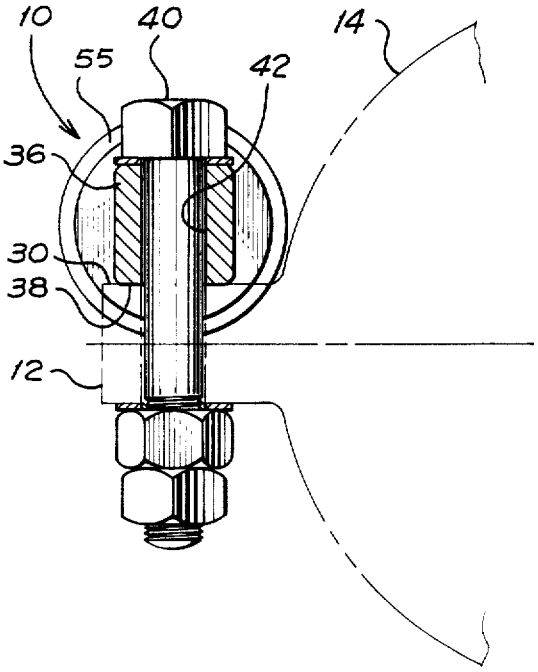
FIG. 4 is an enlarged cross-sectional view of the typical embodiment of the present invention shown in FIG. 3, taken substantially along lines 4—4 thereof.

Now referring to FIGS. 2 and 3, housing 16 is illustrated as including a solid, central mounting base portion 36 having a flat lower mounting surface 38 which rests against the mounting surface 30 of lug 12. Mounting base 36 is secured to lug 12 by capscrew 40 which extends through a cross bore 42 formed in housing mounting base portion 42 and through aligned lug hole 34 to engage torque nut 43 and lock nut 44. A flat 45 is formed in the upper surface of mounting base 36 to provide a bearing surface for the head of capscrew 40.

Continuing consideration of the elements shown in FIGS. 2 and 3, a pair of core mounting arms 46 cantilever longitudinally outwardly from the end portion of housing mounting base portion 36 facing target 22. Arms 46 are disposed in spaced parallel relationship to each other to thereby define a gap or opening between them. The outer surfaces of arms 46 are transversely curved or arcuate in cross section while the inwardly directed surfaces of said arms are flat, FIG. 2. A threaded cross hole 48 extends through each arm 46 in a direction perpendicular to the flat inside surface of said arms, with said cross holes 48 concentrically aligned with each other. Also, cross holes 48 are positioned along the length of arms 46 to lie substantially halfway between holes 34 of lugs 12 and 13. Each arm 46 also includes a distal tip portion 50 which is formed in the same thickness as arms 46 but with a width narrower than the width of said arms 46. Housing 16 also includes a socket 52 extending longitudinally of the end of base 36 in a direction opposite to arms 46, FIG. 2. Socket 52 is circular in transverse cross section and is formed by a cylindrical wall 54 which has an outer circumference concentric with and somewhat larger than the outer circumference of housing base 36. A flange 55 is formed around the circumference of the end portion of socket 52 opposite base 36. Socket 52 is adapted to receive a three-pin male electrical connector 56. Connector 56 has a flange 57 corresponding to and abutting against housing flange 55. Connector 56 is held within socket 52 by a weldment formed around the circle defined by the abutting intersection of flanges 55 and 57.

Housing arms 46, as illustrated in FIGS. 2 and 3, support magnetic cores 18 in spaced parallel relationship to each other. Each core 18 is of two-piece construction including a generally dish-shaped outer core member 58 which serves as one pole of the core and a post-shaped central core member 60 which serves as the other pole of the core. As shown, outer core member 58 is constructed from a substantially flat, circular base portion and a circular rim portion which encircles and extends upwardly from one side of said base portion. A plurality of slots 66 are formed about the circumference of outer core member 58 to extend radially inwardly through the thickness of its rim portion and into its circular base portion. The outer core member 58 also includes a central, hollow, externally and internally threaded stud 68 which engages within threaded cross hole 48 of a corresponding arm 46 to position said core outer member 58 in abutting relationship with the inside surface of said arm 46. A circular shaped recess is centrally formed within the side of the base portion of outer core member 58 opposite stud 68 for closely receiving therein the correspondingly shaped post portion 72 of central core member 60. Central core member 60 also includes a threaded stud 74 which extends coaxially longitudinally from post portion 72 to engage within the threaded interior of core outer member stud 68. For calibration purposes, the end portion of stud 74 opposite post portion 72 is transversely slotted for receiving the blade of a tool (such as a screwdriver, not shown), which may be used to adjust the relative engagement between stud 74 and stud 68 to thereby vary the standout or height of central core member post portion 72 relative to the outer core member 58.

It can be appreciated that since cross holes 48 of arms 46 are located halfway between mounting lug holes 34, outer core member 58, which engages within said arm holes 48, are concentrically aligned with each other and also located halfway between mounting lug holes 34. The same is true for central core members 60 which thread into the threaded hollow interior of outer core member studs 68. Also, since the inwardly directed, flat surfaces of arms 46 are disposed parallel to each other, the outer members 48 of the two cores 18 are disposed relative to each other in spaced parallel relationship. The same is true for the central member 60 of cores 18.

Because cores 18 serve as a component of a magnetic network, it is preferable that said cores 18 be constructed from magnetically permeable material. Also, cores 18 should be formed from material that is corrosion resistant to enable said cores 18 to withstand the harsh environments normally associated with aircraft landing gear and truck axles. Examples of such materials include so-called Mu-metal and various types of high permeability, corrosion resistant, electrical steels.

As best shown in FIGS. 2 and 3, outer member 58 and central member 60 of each core 18 cooperate together to define an annularly shaped groove for securely receiving therein a wire coil 20. Coil 20 is constructed ideally from number 38 gage wire formed into approximately 200 turns. However, coil 20 can be formed not only from wire of other sizes, but also with various numbers of turns. Coil 20 is held within core 18 by a suitable adhesive such as epoxy resin. Two end portions of leads 76 extend away from each coil 20 through outer core member slots 66 and then through elongate bores 80 formed longitudinally through the length of mounting base 36 of housing 16, FIG. 2. Besides serving as a passageway for coil leads 76, slots 66 also serve to break up the eddy currents which tend to extend around the circumference of core 18 and coil 20 when said coil is electrically energized. The portion of each lead 76 extending through bore 80 is encased by a Teflon guide tube 82 to thereby minimize the possibility that leads 76 may chafe against housing 16. In lieu of guide tubes 82, leads 76 could be insulated with a tough, wear resistant covering to prevent said leads from rubbing against housing 16. After leads 76 have passed through bore 80, they are interconnected with electrical connector 56 disposed within housing socket 52. The leads 76 which are connected to the inside ends of the two coils 20 are interconnected together at their juncture with wire connector 56 to thereby interconnect said two coils 20 in series. Accordingly, wire connector 56 includes three male output prongs, not shown, one connected to the leads 76 extending from the inside ends of coils 20 and one each connected to the leads 76 extending from the outside ends of each coil 20. The end portion of connector 56 opposite housing 16 is threaded to receive a correspondingly threaded end portion of a female electrical connector, not shown, to thereby carry electrical output signals produced by transducer 10 away to an analyzing station.

Although cores 18 are illustrated in FIGS. 2 and 3 as being generally circular in form, said cores 18 could be constructed in other shapes such as U-shaped or horseshoe shaped, with each leg of the "U" serving as a pole. Accordingly, a coil could be wrapped around the central bridge which connects the two legs of such U-shaped core.

Referring again to FIGS. 2 and 3, target 22 is illustrated as including a substantially solid mounting base portion 90 having a substantially flat lower mounting surface 92 bearing against the upper surface 32 of mounting lug 13 to enable said target 22 to move with said lug 13. Target 22 is mounted on lug 13 by capscrew 40 which extends through a cross hole 96 formed within mounting base 90 in a direction substantially perpendicular to the plane of mounting surface 92. Capscrew 40 also extends through hole 34 provided in lug 13 to engage with a torque nut 43 and a lock nut 44. A flat 100 is formed in the outer or upper surface of mounting base 90 diametrically opposite mounting surface 92 to provide a bearing surface for the underside of the head of capscrew 40.

As shown most clearly in FIGS. 2 and 3, target 22 also includes a straight, flat target plate 26 which cantilevers longitudinally outwardly from the end of target mounting base 90 facing housing 16. Plate 26 is elevationally positioned halfway between mounting surface 92 and flat 100, and is disposed substantially parallel with said mounting surface 92. As seen in FIG. 2, plate 26 is generally rectangular in shape with the corners of its free end portion diagonally chamfered. Since plate 26 forms a portion of the path along which the magnetic flux lines generated by cores 18 and coils 20 travel, preferably said plate 26 is constructed from magnetically permeable material, such as Mu-metal.

Plate 26 extends toward housing 16 to lie normally approximately equidistant from the two cores 18 to thereby form an air gap between said plate 26 and each of said cores 18 and their corresponding coils 20. As plate 26 moves with lug 13 relative to lug 12, plate 26 is free to shift toward and away from each core 18 to thereby alter the air gaps existing therebetween. Plate 26 may also pivot relative to cores 18.

However, to limit the relative movement between plate 26 and cores 18 to prevent damage to transducer 10, for instance, during shipment and installation, target 22 is provided with a tip portion 104 which extends longitudinally outwardly from said plate 26 to engage within a horizontally oblong socket 106 formed in the end portion of housing mounting base 36 facing target 22, FIGS. 2 and 3. Tip portion 104 is formed in a circular cross section having a diameter somewhat smaller than the minor diameter of socket 106. Tip portion 104 and socket 106 cooperates together to prevent plate 126 from contacting against and thereby damaging cores 18 and coils 20.

Figure 5:
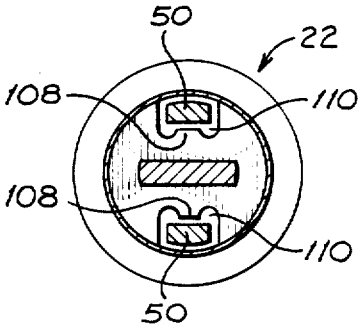
FIG. 5 is an enlarged cross-sectional view of the typical embodiment of the present invention shown in FIG. 3, taken substantially along lines 5—5 thereof.

As best illustrated in FIGS. 3 and 5, additional stops to limit the relative movement between plate 26 and cores 18 are formed by the tip portions 50 of arms 46 abutting against bosses 108 upstanding from the bottom of recesses 110 formed diametrically oppositely to each other in the end portion of target mounting base 90 adjacent the fixed end of said plate 26. Bosses 108 extend transversely away from plate 26 to thereby limit the translation of said plate 26 toward and away from cores 18. Also, the impingement of bosses 108 against arm tips 50 together with the impingement of socket 106 against plate tip 104 limit the angular movement of plate 26 relative to cores 118 about a rotational axis extending transversely across said plate 26 to thereby prevent said plate 26 from bottoming against either of the two cores 18.

Now referring to FIGS. 2 and 3, housing 16 and target 22 are flexibly interconnected by bellows 28 having a convoluted central portion 112 and end collars 114 which closely encircle a circular, undercut shoulder 116 extending radially outwardly from the end portion of target mounting base 90 adjacent the fixed end of target plate 26 and undercut shoulder 118 extending radially outwardly from the end portion of housing mounting base 36 adjacent arms 46. Ideally, collars 114 are hermetically sealed with housing 16 and target 22 by weldments or a suitable adhesive extending around the end edges of each collar 114 at shoulders 116 and 118 to prevent moisture and other contaminants from affecting the operation of transducer 10.

Bellows 28 nominally positions housing 16 relative to target 22 so that their respective mounting cross holes 42 and 96 align with holes 34 in mounting lugs 12 and 13. Also, bellows 28 nominally support target 22 relative to housing 16 so that target plate 26 lies substantially parallel to and halfway between cores 18, FIG. 3, without appreciably inhibiting free relative movement between said plate 102 and said cores 18. Bellows 18 may be constructed from metal or any other suitable material capable of adequately enclosing and protecting target plate 26, cores 18 and coils 20 while also permitting substantially unrestricted movement of said target plate 26 relative to cores 18 within the limits allowed by the above described stops.

The typical embodiment of the variable reluctance transducer 10 described above and illustrated in FIGS. 1–5, may be mounted directly to the particular structural member in which the load carried thereby is to be monitored. For instance, transducer 10 may be mounted on lugs 12 and 13 of bogie beam 14 simply by capscrews 40 which engage torque nuts 43 and lock nuts 44. Once transducer 10 is in place, only a female electrical connector, not shown, must be attached to male connector 56 to render transducer 10 operable.

When bogie beam 14 is unloaded, it is undeformed so that lugs 12 and 13 are aligned with each other. Correspondingly, target plate 26 is disposed halfway between the two cores 18 and their associated coils 20. If an alternating current electrical signal of, for instance, 10 volts and 16 kilohertz is imposed across coils 20, which are wired together, for example, in series, the output signal obtained by monitoring one of the two coils 20 will be approximately one-half of the input signal voltage. This particular level of output voltage results from the fact that target plate 102 is disposed halfway between cores 18 so that the magnetic reluctance between each coil 20 and target plate 26 is of equal magnitude thereby producing an equal magnetic inductance within each coil 20.

However, if bogie beam 14 is loaded by force F due to the weight of an aircraft, a shear stress is imposed in said beam 14. The shear strain in bogie beam 14 resulting from this shear stress causes lugs 12 and 13 to shift vertically relative to each other. As a consequence, target plate 26 moves closer towards one core 18 and coil 20 and further away from the opposite core 18 and coil 20, thereby causing the magnetic reluctance between the closer coil 20 and target plate 26 to decrease while causing the magnetic reluctance between target plate 26 and the further coil 20 to increase due to the increased air gap therebetween. The decrease in magnetic reluctance between plate 26 and the closer coil 20 gives rise to an increase in the magnetic inductance of such coil and thus an increase in the voltage drop across this coil. Correspondingly, an increase in magnetic reluctance between plate 26 and the more distant coil 20 causes a decrease in the magnetic inductance of such coil and thus a decrease in the voltage drop across this coil. However, since coils 20 are wired together, the total voltage drop across said two coils 20 remains the same. Thus, by monitoring the voltage drop across one of the coils 20, and comparing this voltage drop to the total voltage drop across both coils 20, it is possible to determine the distance separating target plate 26 and the monitored coil 20 to thereby ascertain the relative displacement between lugs 12 and 13 produced by the shear strain within bogie beam 14. From the relative displacement between lugs 12 and 13, it is possible to calculate the weight of the load being carried by the bogie beam 14.

By imposing an alternating current of, for instance, 10 volts r.m.s. and 16 kilohertz across coils 20, an output signal having a 5 volt bias and approximately a 200 millivolt variation due to the load on bogie beam 14 can be achieved. This output signal is much higher and the source impedance is significantly less than that produced by utilizing strain gages to determine the relative movement between lugs 12 and 13. Consequently, transducer 10 is capable of withstanding low impedance electrical leakages which would render a strain gage transducer inoperative. Furthermore, the change in output signal voltage of approximately 200 millivolts as bogie beam 14 varies between a loaded and unloaded condition is far greater than the output signal change generated from a strain gage type transducer used to measure the same load variation. Accordingly, the present invention is capable of very accurately measuring the magnitude of load being carried by a structural member such as bogie beam 14.

Rather than wiring coils 20 together in series to be used in a voltage divider type circuit in the manner described above, coils 20 could be wired in parallel as part of a resonance circuit. Alternatively, coils 20 could be connected together in a manner permitting independent impedance measurements to be made for each coil 20.

Constructing transducer 10 in the manner described above renders it insensitive to non-vertical strains occurring in bogie beam 14 due to non-weight related forces. Forces such as those caused by winds, scrubbing sideloads and braking, induce various degrees of bending and twisting strains on bogie beam 14, which strains are not related to the load on bogie 14 caused by the weight of the aircraft. For this reason, transducer 10 has been designed and constructed to measure only vertical shear strains occurring in bogie beam 14 and is not influenced by other bending stresses and strains. If a side load is imposed on bogie 14 causing it to rotate about a vertical axis, target plate 26 is free to move side-to-side relative to cores 18 and coils 20 without affecting the average air gap therebetween, and therefore, the output signal from the monitored coil 20. Moreover, if one of the above-mentioned extraneous forces causes bogie beam 14 to bend about a horizontal axis causing target plate 26 and cores 18 to tip relative to each other, the average distance between said plate 26 and cores 18 remains the same since the center line of said coils is located longitudinally halfway between lugs 12 and 13. As a result, the output signal from coils 20 is not affected.

Furthermore, constructing transducer 10 with two cores 18 and coils 20 in the manner described above enables transducer 10 to correctly measure the relative movement of lugs 12 and 13 due to shear strains in bogie 14 in spite of changes in the temperature of the surrounding environment. As the temperature adjacent bogie 14 varies, a relatively large change in the electrical resistance of the wires composing coil 20 occurs, while a relatively small change in the inductance of coils 20 occurs. However, since transducer 10 is wired to compare the voltage drop across one coil 20 with respect to the total voltage drop across both coils 20 and since the impedance of both coils 20 due to temperature variations is altered by an equal magnitude, this change is effectively nulled out. Thus, no special electrical components or circuitry are required to compensate for the changes in temperature surrounding transducer 10.

Moreover, the construction of transducer assembly 10 as here disclosed permits said transducer to be calibrated before it leaves the factory so that it may be substituted for any other transducer 10 without the need for any further adjustments. This is accomplished by adjusting the engagement between core central member stud 74 and core outer member stud 68 to thereby achieve a uniform total air gap in each transducer 10 between target plate 26 and the two central core members 60. Alternatively, the engagement between core outer member stud 68 and corresponding arm threaded cross hole 48 can be varied to obtain this same result. A shim or spacer, not shown, can be sandwiched between arm 46 and the back side of outer core member 58 to maintain said two members tightly engaged with each other. It is also possible to calibrate transducers 10 by manufacturing targets 22 with plates 26 of varying thicknesses and then matching targets 22 with housings 16 to obtain a uniform total air gap between target plate 26 and cores 18. Regardless of what specific calibration technique is utilized, the overall objective is to alter the reluctance of the magnetic paths extending between cores 18 and target plate 26. The techniques described above not only permit the reluctance of the two paths to be varied relative to each other so that an equal reluctance in the two paths can be achieved, but also by allowing the total air gap between target plate 26 and cores 18 to be adjusted, the calibration techniques enable a uniform span sensitivity or uniform rate of change of reluctance for a given unit movement of target plate 26 relative to cores 18 to be achieved.

By arranging transducers 10 on bogie beam 14 in the manner illustrated in FIG. 1, said transducers can be utilized to determine the weight distribution among tires 124–127. For instance, if tire 124 is under inflated, it will carry less weight than that carried by tire 125, thereby imposing a torque load and resulting torsional strain on bogie 14. As a result, in the transducer 10 located adjacent the under inflated tire 124, target plate 102 moves transversely toward one coil 20 while in the transducer 10 located adjacent tire 124, the target plate 26 moves toward the opposite coil 20 thereby producing a variation in the output signals from these two transducers 10. Since the level of the output signal from a particular transducer 10 is related to the weight carried by the tire located adjacent to said transducer 10, the loads carried by each tire can be determined. Thus, by measuring not only the load carried by each tire, but also the variations therebetween, it is possible to determine when a particular tire is under inflated and thereby present potential tire failure related accidents from occurring. Moreover, since the algebraic sum of the output signals from the two transducers corresponding to tires 124, 125 is constant for a particular load F on bogie member 14, the actual total load carried by tires 124, 125 will be correctly measured by transucers 10 in spite of the difference in load carried by tires 124 and tire 125.

The present invention is not limited to measuring unidirectional shear strains in a loaded member but may also be used to measure strains caused by either a compression or tensile load acting in a particular direction while not being affected by compression and tensile loads acting in other directions. This may be accomplished by orientating coils 20 and target plate 26 so that they lie perpendicularly to the direction of the tensile or compression load of interest.

Furthermore, rather than mounting transducer 10 on a member having mounting points in the form of lugs 12 and 13, said transducer can be mounted in other manners such as with a hollow axle member through the use of mounting structures similar to the cylindrically shaped disks disclosed in the aforementioned U.S. Pat. No. 3,521,484 to Dydvad. Transducer 10 could even be strapped directly to the exterior or to the hollow interior of the loaded member through the use of various clamping devices. Moreover, rather than attaching transducer 10 to a component of the structure being monitored, transducer 10 could be incorporated as a part of a load cell. In summary, transducer 10 may be mounted in numerous manners and on various types of mounting structures as long as coils 18 are free to move relative to target plate 26 in response to the strain or deflection of the monitored member as it is subjected to a load.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A variable reluctance transducer assembly adapted to be mounted between two spaced apart, relatively movable mounting points *disposed on an elongate load bearing structural member* subject to movement in response to a load [,] *applied perpendicularly to the longitudinal axis of the structural member, said assembly* comprising:

(a) an elongate housing adapted to be mounted on one of the two mounting points to move therewith;

(b) a pair of magnetic cores supported by said housing in spaced apart relationship *and generally aligned with the axes thereof parallel to the load;*

(c) a *single* coil secured to each of said two cores substantially in aligned, *coaxial,* spaced parallel relationship to each other *with the axes thereof located substantially halfway between said mounting points*; and (d) target means adapted to be mounted on the opposite of the two mounting points to move therewith and independently of the movement of said housing, said target means including a mounting base and a magnetically permeable target cantilevered outwardly from said mounting base toward said housing to lie nominally in spaced, *interposed* relation [with respect to] *between* said two magnetic cores and their corresponding coils, said target having a first planar surface disposed nominally parallel to the plane defined by one of said magnetic cores and its corresponding coil and a second planar surface disposed nominally parallel to the plane defined by the second of said two magnetic cores and its corresponding coil.

2. A variable reluctance transducer assembly adapted to be mounted between two spaced apart, relatively movable mounting points subject to movement in response to a load, comprising:

(a) an elongate housing adapted to be mounted on one of the two mounting points to move therewith;

(b) a pair of magnetic cores supported by said housing in spaced apart relationship;

(c) a coil secured to each of said two cores substantially in aligned, spaced parallel relationship to each other;

(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and (e) wherein said housing includes a mounting base for mounting said housing on its corresponding mounting point, and a pair of spaced apart core mounting arms cantilevered longitudinally of said housing mounting base toward said target means to locate said coils centrally between the two mounting points.

3. A variable reluctance transducer assembly according to claim 2, further comprising stop means for limiting the translational movement of said target toward and away from said two cores and the relative rotational movement between said target and said cores about an axis extending perpendicularly of the length of said arms and the central axis of said coils.

4. The variable reluctance transducer assembly according to claim 3, wherein:

said target comprises a flat plate disposed nominally between said two magnetic cores; and said stop means includes a tip member extending longitudinally outwardly of the free end portion of said target in a direction opposite said target means mounting base, and said housing includes portions forming a socket for receiving said target tip member therein.

5. A variable reluctance transducer according to claim 4, wherein said stop means further includes a tip member extending longitudinally outwardly from the free end portion of each of said housing arms in a direction toward said target means mounting base, and a pair of spaced apart bosses formed on said target means mounting base for bearing against a corresponding housing arm tip member, said two bosses extending transversely oppositely away from said target.

6. A variable reluctance transducer assembly adapted to be mounted between two spaced apart, relatively movable mounting points subject to movement in response to a load, comprising:

(a) an elongate housing adapted to be mounted on one of the two mounting points to move therewith;

(b) a pair of magnetic cores supported by said housing in spaced apart relationship;

(c) a coil secured to each of said two cores substantially in aligned, spaced parallel relationship to each other;

(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and (e) further comprising stop means permitting said target and said two cores to move relative to each other through a limited distance and angle.

7. A variable reluctance transducer assembly adapted to be mounted between two spaced apart, relatively movable mounting points subject to movement in response to a load, comprising:

(a) an elongate housing adapted to be mounted on one of the two mounting points to move therewith;

(b) a pair of magnetic cores supported by said housing in spaced apart relationship;

(c) a coil secured to each of said two cores substantially in aligned, spaced parallel relationship to each other;

(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and (e) further comprising flexible joiner means interconnecting said housing and said [joiner] *target* means to permit said target and said cores to move relative to each other in response to the relative movement between the mounting points, said joiner means enclosing and protecting said two cores and their corresponding coils and said target.

8. A variable reluctance transducer assembly according to claim 7, wherein:

said flexible joiner means comprises a bellows member having first and second end collars, said target means includes a shoulder for snugly receiving one of said bellows end collars, and said housing includes a shoulder for snugly receiving the second of said bellows end collars.

9. A variable reluctance transducer assembly adapted to be mounted between two spaced aprt, relatively movable mounting points *disposed on an elongate load bearing structural member* subject to movement in response to a load [,] *applied perpendicularly to the longitudinal axis of the structural member, said assembly* comprising:

(a) an elongate housing adapted to be mounted on one of the two mounting points to move therewith;

(b) a pair of magnetic cores supported by said housing in spaced apart relationship *and generally aligned with the axes thereof parallel to the load;*

(c) a *single* coil secured to each of said two cores substantially in aligned, *coaxial,* spaced parallel relationship to each other *with the axes thereof located substantially halfway between said mounting points;*

(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and (e) further comprising calibration means for selectively altering the reluctance of the first and second magnetic paths extending between said target and said first and second cores, respectively, to thereby alter the relative reluctance of the two paths with respect to each other and to alter the rate of change of reluctance of the magnetic paths with respect to the relative spacing between said target and said first and second cores.

10. A variable reluctance transducer assembly [according to claim 9, wherein said] *adapted to be mounted between two spaced apart, relatively movable mounting points subject to movement in response to a load, comprising:*

*(a) an elongate housing adapted to be mounted on one of the two mounting points to move therewith;*

*(b) a pair of magnetic cores supported by said housing in spaced apart relationship;*

*(c) a coil secured to each of said two cores substantially in aligned, spaced parallel relationship to each other;*

*(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and*

(*e*) calibration means [comprises] *comprising* means for altering the location of said first and second cores relative to said housing to vary the distance separating said first and second cores.

11. A variable reluctance transducer assembly adapted to be mounted between two spaced apart, relatively movable mounting points subject to movement in response to a load, comprising:

(a) an elongate housing adapted to be mounted on one of the two mounting points to move therewith;

(b) a pair of magnetic cores supported by said housing in spaced apart relationship;

(c) a coil secured to each of said two cores substantially in aligned, spaced parallel relationship to each other;

(d) target means adapted to be mounted on the second of the two mounting points to move therewith, said target means including a mounting base and a magnetically permeable target cantilevered outwardly from said mounting base toward said housing to lie nominally in spaced relation with respect to said two magnetic cores and their corresponding coils; and (e) wherein the thickness of the target is such to provide a preselected total air gap between said target and said two cores, and the nominal location of said target relative to said cores is such that a uniform thickness gap exists between each core and said target.

12. A variable reluctance transducer assembly, comprising:

(a) a pair of magnetically permeable cores;

(b) a coil carried by each of said two cores;

(c) a housing including a mounting base having a mounting pad, and a pair of core mounting arms cantilevered longitudinally from said base member for supporting said two cores in aligned, spaced parallel relationship to each other to define a gap therebetween, said cores being disposed so that said coils face each other;

(d) target means including a mounting base having a mounting pad, and a flat, magnetically permeable target cantilevered outwardly from said mounting base; and (e) joiner means interconnecting said target means and said housing to nominally locate said target generally parallel with said cores while permitting said target to both pivot relative to said two cores and translate toward and away from said two cores, said joiner means cooperating with said target means and said housing to protectively encase said target and said cores.

13. A variable reluctance transducer assembly according to claim 12, wherein each of said cores is generally disk shaped and has an annularly shaped groove formed in one side thereof for receiving a corresponding coil therein.

14. A variable reluctance transducer assembly according to claim 12, wherein said core support arms nominally support said cores and their corresponding coils longitudinally midway between the mounting pad portions of said housing base and said target base.

15. A variable reluctance transducer assembly according to claims 12 or 14, further comprising means for limiting the translational and rotational movement of said target toward and away from said two coils.

16. A variable reluctance transducer assembly according to claim 15, wherein:

said target includes a flat plate disposed between said two cores nominally forming an air gap relative to each of said cores; and said movement limiting means comprises a tip member extending longitudinally of said target plate in a direction opposite said target base and a socket formed in said housing base for receiving said target plate tip member, and a tip member extending longitudinally of each of said housing arms in a direction opposite said housing base, and a pair of transversely spaced apart bosses formed in said target means base for abutting against a corresponding housing arm tip member.

17. A variable reluctance transducer assembly according to claim 12, further comprising calibration means for varying the reluctance of the two magnetic paths extending between said target and said first and second cores to change the relative reluctance of the two magnetic paths relative to each other and to alter the rate of change of the reluctance of the two magnetic paths with respect to the relative spacing between said target and said first and second cores.

18. A variable reluctance transducer assembly according to claim 17, wherein said calibration means comprises means for altering the location of said first and second cores relative to said housing.

19. A variable reluctance transducer according to claim 18, wherein said means for altering the location of said first and second cores relative to said housing includes a threaded stud extending outwardly from each of said two cores, and a threaded opening provided in each of said core mounting arms for receiving a corresponding core stud.

20. A variable reluctance transducer assembly according to claim 17, wherein each of said cores includes:

an outer core member formed about a center and secured to a corresponding mounting arm, a center post core member disposed concentrically within said outer core member portion, and means for selectively lengthwise shifting said center core member relative to said outer [post] *core* member to vary the total gap between said target and said two center core members and to vary the gap between each center core member and said target.

21. A variable reluctance transducer according to claim 17, wherein said target is of a thickness to provide a preselected total gap between said target and said cores, and said target is nominally located to provide an equal width gap between said target and each of said cores.

22. An apparatus for sensing the shear forces on an aircraft landing gear beam member with spaced apart first and second lugs extending transversely outwardly from the landing gear member to shift relative to each other in response to the deformation of the beam member under the weight of the aircraft, each lug having a substantially flat mounting surface aligned in coplanar relationship with the mounting surface of the other lug, said apparatus comprising:

(a) a first core;

(b) a first coil supported by said first core;

(c) a second core;

(d) a second coil supported by said second core;

(e) a housing adapted to be mounted on one of the two lugs to move therewith, said housing supporting said first and second cores and coils in concentric, spaced parallel relationship to each other;

(f) target means mounted on the second of the two lugs to move therewith, said target means including a target plate cantilevered outwardly from said second lug to lie between said first and second cores and coils, said target plate movable relative to said first and second cores and coils in response to the relative movement between the two mounting lugs.

23. The apparatus according to claim 22, wherein said first and second coils are generally circular in shape, and wherein said first and second cores support said first and second coils, respectively, in coaxially aligned relationship relative to each other and generally parallel to the flat mounting surface of the housing mounting lug at a location substantially halfway between the two longitudinally separated mounting lugs.

24. The apparatus according to claims 22 or 23, further comprising flexible joiner means for interconnecting said housing and said target means to enclose said first and second cores and coils and said target plate while permitting said housing and said target means to move relative to each other.

25. The apparatus according to claim 24, wherein said joiner means comprises a bellows member having cylindrical end portions, and wherein said housing and said target means both include shoulder portions encircling said housing and said target means for closely receiving one end portion of said bellows member.

26. The apparatus according to claim 22, wherein:

(a) said first core includes a center pole member having a free end portion extending through the center of said first coil, and a first outer pole member circling said first coil and connected in magnetically conductive communication with said first center pole member;

(b) first calibration means for selectively adjusting the location of the free end portion of said first center pole relative to said first outer pole member toward and away from said second coil;

(c) said second core includes a second center pole member having a free end portion extending through the center of said second coil and second outer pole member encircling said second coil and connected in magnetic conductive communication with said second pole member, and (d) second calibration means for selectively adjusting the location of the free end portion of said second center pole member relative to said second outer pole member of said second core toward and away from said first coil.

27. The apparatus according to claim 22, further comprising stop means for limiting the movement of said target plate relative to said first and second cores to prevent damage to said target plate and said cores during handling and installation of the apparatus.

28. A method for calibrating a variable reluctance transducer having a pair of magnetically permeable cores disposed in spaced apart relationship by a housing and a target plate nominally located between and movable relative to the two cores, by altering the reluctance of the two magnetic paths extending between the target plate and the cores, comprising the steps of:

matching the housing with a target plate of a particular thickness to provide a preselected total gap between the target plate and the cores, and nominally locating the selected target plate equidistant from the two cores.

* * * * *